(12) United States Patent
Jerolm

(10) Patent No.: US 11,184,194 B2
(45) Date of Patent: Nov. 23, 2021

(54) DISTRIBUTED PROCESSING OF PROCESS DATA

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 93 days.

(21) Appl. No.: 16/694,026

(22) Filed: Nov. 25, 2019

(65) Prior Publication Data

US 2020/0092140 A1    Mar. 19, 2020

Related U.S. Application Data

(63) Continuation of application No. PCT/EP2018/062907, filed on May 17, 2018.

(30) Foreign Application Priority Data

May 24, 2017   (DE) ..................... 10 2017 208 827.3

(51) Int. Cl.
*H04L 12/40* (2006.01)
*H04L 12/42* (2006.01)
(Continued)

(52) U.S. Cl.
CPC .......... *H04L 12/5601* (2013.01); *G06F 9/546* (2013.01); *G06F 13/362* (2013.01);
(Continued)

(58) Field of Classification Search
CPC ... H04L 9/0618; H04L 67/10; H04L 12/5601; G06N 3/084; G06Q 30/08; G06F 21/577
See application file for complete search history.

(56) References Cited

U.S. PATENT DOCUMENTS 5,472,347 A   12/1995   Nordenstrom et al.
10,069,641 B2   9/2018   Bunte et al.
(Continued)

FOREIGN PATENT DOCUMENTS

DE   10 2014 105 207 A1   10/2015
EP   0 802 655 A2   10/1997
EP   1 933 494 A1   6/2008

OTHER PUBLICATIONS

Vorlesung Bussysteme, Chap. 7: Prozessbusse, Busse in der Automatisierung at http://docplayer.org/19164956-Prozessbusse-busse-in-der-automatisierung.html, pp. 1-2 to 1-38 (Jan. 30, 2018).
(Continued)

*Primary Examiner* — Iqbal Zaidi
(74) *Attorney, Agent, or Firm* — Muncy, Geissler, Olds & Lowe, P.C.

(57) ABSTRACT

A method for the distributed processing of process data in a local bus, wherein the local bus has a local bus master and at least two data bus participants, and the method comprises: sending a data packet with process data from the local bus master via the local bus; receiving the data packet at a first data bus participant; pre-processing at least one item of process data using the first data bus participant; sending the data packet with the at least one item of pre-processed process data via the local bus to the second data bus participant using the first data bus participant; receiving the data packet with the at least one item of pre processed process data at the second data bus participant; and further processing the at least one item of pre-processed process data using the second data bus participant.

15 Claims, 3 Drawing Sheets

(51) Int. Cl.
*H04L 12/70* (2013.01)
*H04L 12/54* (2013.01)
*G06F 9/54* (2006.01)
*G06F 13/362* (2006.01)

(52) U.S. Cl.
CPC ........ *H04L 12/40032* (2013.01); *H04L 12/42* (2013.01); *H04L 2012/4026* (2013.01); *H04L 2012/568* (2013.01)

(56) References Cited

U.S. PATENT DOCUMENTS

| | | | |
|---|---|---|---|
| 2011/0283027 A1* | 11/2011 | Buesching | ........ H04L 12/40032 710/105 |
| 2016/0359978 A1 | 12/2016 | Chandhoke et al. | |
| 2017/0300435 A1* | 10/2017 | Becker | ................ G06F 12/1081 |
| 2019/0140859 A1* | 5/2019 | Kern | ...................... G07C 5/085 |

OTHER PUBLICATIONS

German Search Report for German Application No. 10 2017 208 827.3 dated Jan. 30, 2018 with English translation.

* cited by examiner

DISTRIBUTED PROCESSING OF PROCESS DATA

This nonprovisional application is a continuation of International Application No. PCT/EP2018/062907, which was filed on May 17, 2018, and which claims priority to German Patent Application No. 10 2017 208 827.3, which was filed in Germany on May 24, 2017, and which are both herein incorporated by reference.

BACKGROUND OF THE INVENTION

Field of the Invention

The present invention relates to the distributed processing of process data, and more particularly to the distributed processing of process data to data bus subscribers of a local bus, particularly of a ring bus.

Description of the Background Art

A ring bus is generally used in an automation system. Automation systems are used in particular for the control of industrial installations, buildings, and by means of transport. For the control of an automation system usually several sensors and actuators are necessary. These monitor and control the process performed by the system. The different sensors and actuators of an automation system are often referred to as automation devices.

These automation devices can either be connected directly to a controller of the automation system or can first be connected to input and output modules, which are often referred to as I/O modules. These can in turn be connected directly to the controller. The automation devices can either be integrated directly in the I/O modules or can be connected to them via wire or wirelessly.

The control of an automation system is usually accomplished with the help of one or more programmable logic controllers, PLC. The PLCs can be arranged hierarchically or decentrally in an automation system. There are different performance levels for the PLC, so that they can take over different controls and regulating techniques depending on the computing and storage capacity. A PLC in the simplest case has inputs, outputs, an operating system (firmware) and an interface through which a user program can be loaded. The user program determines how the outputs are to be switched in dependence on the inputs. The inputs and outputs can be connected to the programmable controllers and/or the I/O modules, and the logic stored in the user program can be used to monitor or control the process performed by the automation system. In this case, the monitoring of the process is accomplished by the sensors and the control of the process by the actuators. The controller can also be referred to as a central controller or central unit and assumes control of at least one automation device or I/O module connected to the controller.

However, the direct connection of the automation devices with the at least one controller or the I/O modules with the at least one controller in the form of a parallel wiring, i.e., in each case one line is routed from each automation device or each I/O module to the higher-level control, is very expensive. Especially with the increasing degree of automation of an automation system, the wiring effort increases with parallel wiring. This is associated with great expense in the design, installation, commissioning and maintenance.

For this reason, automation systems generally use bus systems today, with which the automation devices or the I/O modules can be connected to the controller. In order to simplify the connection of the individual automation devices or the I/O modules with the bus system even further, nowadays, individual groups of automation devices or I/O modules using a specialized local bus are initially interconnected to a local bus system and then at least one subscriber of this local bus is connected to the bus system, which is connected to the controller. In this case, the local bus system may differ from the bus system, which is used to realize the connection with the controller.

The subscriber of a group of local bus subscribers connected to the bus system of the controller is often referred to as a local bus master. Alternatively, the term header of the local bus system is used. This local bus master can contain logic, circuits or functionalities that are different from other local bus subscribers, which are necessary for connection to the bus system of the controller. Also, the local bus master itself may include a PLC. This subscriber can also have logic and circuits for conversion between the two bus systems. The local bus master can therefore also be designed as a gateway or bus converter and ensures conversion of the data present in the format of the one bus system to the format of the local bus system and vice versa. Usually, but not mandatory, the local bus master is specialized in connecting the local bus to the higher-level bus.

The local buses used are mostly tailored to the specific use requirements of the automation devices or I/O modules or take into account their special hardware configuration. The groups on automation devices or I/O modules of the local bus system usually form a subgroup of the automation system for the execution of a special task in the process performed by the automation system. The data exchanged on the buses for the process is also often referred to as local bus data or process data, because this data contains information for controlling or regulating the process executed by the automation system. Among other things, this data may include measurement data, control data, status data and/or other information. Depending on the bus protocol used, this data may be preceded (header) or appended (tail) by other data. This other data may include information regarding the data or include information regarding internal communication on the local bus. Here, a variety of different information is known, which can be prefaced or added to the data according to the bus protocol used. The local bus subscribers connected to a local bus can also be referred to as data bus subscribers because they exchange data on the local bus. A data bus subscriber serves for controlling or monitoring a process, in particular by outputting control signals, for example, to actuators and/or by receiving measurement signals, for example, from sensors. The data bus subscriber converts the control signals and/or measurement signals into data for the local bus or vice versa.

A ring bus is a specialized form of local bus, as known for example from U.S. Pat. No. 5,472,347 A. In a ring bus, the data bus subscribers, for example, the automation devices or I/O modules, are each connected to their directly adjacent data bus subscribers and data is forwarded in succession from one to the other data bus subscriber. The data transmitted on the local bus can also be referred to as local bus data. Thus, not all data bus subscribers are sent the data at the same time, but in turn, wherein a data bus subscriber receives data from its upstream data bus subscriber and forwards data to its downstream data bus subscriber. Between receiving the data and forwarding, the data bus subscriber can process the received data. When the data has reached the last data bus subscriber in the series, the data from the last data bus subscriber is returned back to the first data bus subscriber in succession. The return can either be done through all data bus subscribers or past them with the help of a bypass line. Thus, the ring bus has a downward flow and an upward flow of data. The data in a ring bus is usually transmitted in the form of data packets that cycle through all data bus subscribers.

In a ring bus, the data packets are passed on from one data bus subscriber to the other. At any given time, a data bus subscriber always receives only a part of the data packet from its upstream data bus subscriber. The data bus subscribers then take the time they need to process the data contained in the received part of the data packet before it is forwarded. If a data bus subscriber only has a limited time or cycles available to process the data until this has to be forwarded, the executable processing operations are limited.

SUMMARY OF THE INVENTION

It is therefore an object of the present invention to provide a method and a device with which even complex processing with process data is possible without the latter remaining on a respective data bus subscriber for longer than the previously determined fixed time or cycles available to a data bus subscriber for processing data.

The method according to the invention for the distributed processing of process data in a local bus, in particular a ring bus, with a local bus master and at least two data bus subscribers initially includes the transmission of a data packet containing process data via the local bus, wherein the data packet is sent from the local bus master. The data packet is preferably originally generated by the local bus master and sent via the local bus to the data bus subscribers. During generation, the local bus master can insert process data received from the controller, for example a PLC, into the data packet. However, the data packet can also contain process data from the local bus master itself and/or the controller. The data packets can also be referred to as telegrams. A data packet has, for example, header, payload and, advantageously, a checksum. In this case, data packets bearing process data can also be referred to as process data packets. Advantageously, a process data packet has no address for transmitting the process data to or from a data bus subscriber in the local bus. In the process data packet, the process data is arranged, for example, in such a way that data bus subscribers can recognize process data associated with the respective data bus subscriber on the basis of the respective position of the process data in the process data packet, for example, one or more bits within an associated contiguous data block (1 byte). Advantageously, the process data packet has an identifier (IDE) which is assigned to the type of the data packet, that is to say to the process data packet, and can be identified by the data bus subscriber. The process data can also be referred to as local bus data.

The process data packet can be communicated, for example, in a cycle frame. For example, a cycle frame can be defined as a recurring (cyclic) preferably equidistant time interval in which data is transferable on the local bus. The cycle frame has, for example, at least one start identifier (SOC) and a time range for the transmission of data. Several start identifiers (SOC) of successive cycle frames are advantageously in a temporally equidistant distance from one another. The named time range is intended for the transmission of the data packets. The start identifier (SOC) and the data packets are transmitted via the local bus and cycle through all the data bus subscribers. The start identifier (SOC) is separate, i.e., transferable as an independent symbol or advantageously contained in a start data packet (SOC packet).

Within the time range of the cycle frame, none, one or more data packets are transmitted. Advantageously, idle data is inserted in a cycle frame, in particular adjacent to at least one data packet. Advantageously, the transmission of the data packets and/or the idle data causes an uninterrupted signal on the local bus. The signal allows the data bus subscribers to synchronize to this time. Advantageously, the cycle frame additionally has a trailer. The trailer has a variable length and preferably follows the time range for data transmission up to the next start identifier (SOC) of the next cycle frame. Advantageously, the trailer contains idle data.

The data packet and thus the process data contained therein can thereby step through the individual data bus subscribers of the local bus. During the passage of the data packet through the data bus subscribers, these can process the process data contained in the data packet.

A first data bus subscriber receives the data packet, i.e., a first part of the data packet. This part of the data packet may contain the process data intended for the first data bus subscriber. Intended in this context means that the respective process data is suitable for being used by the data bus subscriber for whom it is intended to control, regulate or evaluate this data on precisely this data bus subscriber. However, the first data bus subscriber can also receive process data in the first part of the data packet, which is not intended for this data bus subscriber, but instead for a second data bus subscriber located downstream in the local bus. This means that process data is intended for the one second data bus subscriber so as to perform a control, regulation or evaluation on precisely this data bus subscriber In this case, for example, the part of the data packet received by the first data bus subscriber may exclusively contain process data intended for the first data bus subscriber or contain a part of process data intended for the first data bus subscriber and contain a different part of process data intended for the second data bus subscriber, or only process data intended for the second data bus subscriber.

If the part of the data packet that has just been received has process data that is intended for the second data bus subscriber, then according to the invention the first data bus subscriber executes preprocessing of this process data. The extent of the preprocessing is dependent on how much capacity, i.e., work cycles or time, the first data bus subscriber still has left before the first data bus subscriber has to forward the data packet or the part of the data packet to the second data bus subscriber. The time that a data bus subscriber has available corresponds to the time between reception and forwarding of the data packet. If the part of the data packet currently present at the first data bus subscriber does not have any process data intended for the first data bus subscriber, i.e., the first data bus subscriber does not have to execute any processing, then all the work cycles of the first data bus subscriber are free for preprocessing. After preprocessing, the first data bus subscriber can send the data packet or at least the currently held part of the data packet with the at least one preprocessed process data item via the local bus to the second data bus subscriber. In this case, for example, process data may be a plurality of bits, wherein a single process data item may be a single bit. The first and second data bus subscribers need not be arranged directly adjacent to each other in the local bus. The first data bus subscriber need only be upstream of the second data bus subscriber, i.e., the former must receive the data packet or the part of the data packet to be preprocessed upstream of the second data bus subscriber so that it can perform the processing upstream of the second data bus subscriber.

The inventive method further comprises receiving the data packet with the at least one preprocessed process data item at the second data bus subscriber and further processing the at least one preprocessed process data item by the second data bus subscriber. This further processing can also include carrying out further preprocessing for a data bus subscriber further downstream of the second data bus subscriber. In this case, the second data bus subscriber becomes the first data bus subscriber and performs preprocessing for a second data bus subscriber. However, the further processing can also include a control, regulation or evaluation being carried out with the process data.

Distributing the processing of process data to several data bus subscribers results in an optimal utilization of the resources available on the local bus, i.e., the best use of the free capacity available to the data bus subscribers. In this case, the complexity of preprocessing that can be performed by a data bus subscriber by upstream data bus subscribers is directly proportional to their number and their free capacity. The further a data bus subscriber is arranged from the local bus master in the downlink direction of the local bus, the more preprocessing steps can be performed by the upstream data bus subscribers for this data bus subscriber. The data bus subscribers of the local bus accordingly act as distributed logic for the processing of process data. In this case, the local bus can already be configured in its construction in such a way that the data bus subscribers who require more complex preprocessing of their process data are placed farther away from the local bus master than those data bus subscribers who require simple preprocessing of their process data. Due to the distributed processing, it is also possible to design the individual data bus subscribers in a very simple manner, because complicated processing does not have to be accomplished by one data bus subscriber alone, but instead the processing is distributed over a plurality of data bus subscribers. This also leads to homogeneity in the local bus. It is not necessary to combine high-performance data bus subscribers with low-performance data bus subscribers, but instead the data bus subscribers can all have the same performance. Performance can be assessed in the form of computing capacity.

The preprocessing includes the writing of the at least one process data item to the data packet by the first data bus subscriber. The writing to the data packet can be done into the same part of the data packet from which the process data was previously read or into another part of the data packet. If the at least one process data is written into another part of the data packet, then the at least one process data item is initially stored in the first data bus subscriber until the part of the data packet is present at the first data bus subscriber to be written to. However, the first data bus subscriber can also write into the same part of the data packet and write the at least one process data item, for example, into a different location in this part of the data packet. The process data to be written can originate from the memory of the first data bus subscriber and/or be originally read from the data packet or have been obtained from at least one input of the first data bus subscriber or represent a combination of the aforementioned. It is also conceivable that at least one process data item is read from the data packet, an operation is carried out with this at least one process data item and the at least one processed process data item is again written into the same location in the part of the data packet from which the process data item was read.

In an exemplary embodiment of the inventive method, this further comprises the step of storing the at least one read process data item before it is written. The storing can include all types of holding the at least one read process data item. It is only important that the data bus subscriber have access to the at least one read process data item, i.e., have access to the memory. Accordingly, the at least one read process data item may be stored in the data bus subscriber itself, for example in a memory of the data bus subscriber, or in a memory connected to the data bus subscriber. The connection between data bus subscriber and memory can be wired or wireless. It is also conceivable that the memory is an additional module which can be connected to the data bus subscriber. The memory can be configured as desired.

The data packet can have a multiplicity of symbols, each symbol having a specific number of bits, for example 8 bits, that is, 1 byte. The data packet accordingly cycles through the data bus subscribers unit by unit, piecewise, or partwise, for example in the form of symbols. Such a part of the data packet is also referred to below as a piece or unit of the data packet. Accordingly, the data bus subscribers always have only a part of the data packet at any given time. The last data bus subscriber in the local bus transmits the parts of the data packet processed by this data bus subscriber in the uplink direction, either again through all data bus subscribers or back to the local bus master via a bypass line. If the parts of the data packet are sent again through the data bus subscribers, further processing of the parts of the data packet can take place. For example, a temporal correction of signal edges can be performed. When the parts of the data packet are processed, a distributed preprocessing of the process data according to the invention can also take place, for example, even before the arrival of the process data on the local bus master, in order to carry out evaluations or to convert the process data into a special format so that it can be processed more easily by the local bus master or can be passed on to the higher-level controller.

The receiving can comprise that the data packet is received symbol by symbol, i.e., at any given time always only a part of the data packet is available on the data bus subscriber. This symbol can have 8 bits, i.e., 1 byte. However, the person skilled in the art is aware that the division of the data packet can also be done into other units that comprise more or less than 8 bits. After processing the one part of the data packet, i.e., after processing the one symbol, a data bus subscriber sends the part just processed to the downstream data bus subscriber and in the same step receives a new part of the data packet from the upstream data bus subscriber. Processing of the part of the data packet may also involve the data bus subscriber skipping said part of the data packet, i.e., not carrying out any processing. For a deterministic processing time to be ensured, the part of the data packet can also remain on the data bus subscriber for a certain number of cycles even if it is not processed. This is necessary to give the other data bus subscribers enough time to carry out their processing before a new part of the data packet is received. Processing of a part of a data packet, i.e., for example, from a symbol of a data packet, can be done in a bit-granular manner. Thus, a bit operation may be performed on at least one bit of a received symbol to obtain the at least one preprocessed process data item, wherein the operation represents the processing of the process data item. The bit operations that can be performed are based, for example, on a reduced instruction set that the data bus subscriber can perform, such as "SKIP", "MOVE", "INCREMENT", "NEGATION", "AND" and "OR", or a combination thereof. Which bit operations are to be executed can be stored in the data bus subscriber, for example, by means of instruction lists. For each part of the data packet or for each bit of the data packet, these instruction lists preferably contain an instruction, i.e., an operation to be performed on the corresponding bit. For example, if the data bus subscriber is not to perform processing with the bit, the corresponding instruction list for the corresponding bit may be empty or may have a "SKIP" instruction. The instruction list may also include the number of repetitions for a particular instruction. For example, the instruction list may include a "SKIP" instruction with the instruction to repeat it twice. In this case, the next two bits will not be processed but will be skipped. For the instructions "MOVE", "NEGATION", "INCREMENT", "AND" and "OR", too, parameters can be specified. The data bus subscriber may have stored a plurality of instruction lists. The local bus master can prefix an instruction list index to the process data in the data packet, which instructs the data bus subscribers to use a very specific instruction list for the following parts of the data packet, i.e., the process data. In this case, the instruction list index can refer to a specific memory location in the data bus subscriber in which at least a first instruction of the instruction list is stored, or it can refer to a specific reference pointing to the particular instruction list or at least the first instruction in the instruction list.

In an embodiment of the method according to the invention, this includes reading the at least one process data item from a symbol of the data packet and the subsequent writing of the process data item into the same symbol of the data packet or, for example, into a following symbol of the same data packet. In this case, the following symbol can immediately follow the current symbol or follow it indirectly, i.e., be spaced apart by a number of symbols. In this case, the preprocessing can thus include re-storing the at least one process data item within the same data packet. The first data bus subscriber can thereby read the at least one process data item from a symbol which is currently at the data bus subscriber for processing and can write the at least one process data item into another location in the same symbol before the symbol is sent to the second data bus subscriber for further processing. This reading and writing can be done in two work cycles. This preprocessing by the first data bus subscriber has the advantage that the second data bus subscriber itself does not have to carry out a re-storing process. Accordingly, the second data bus subscriber does not have to sacrifice any work cycles but instead can use its work cycles to carry out its own processing of the process data. It is also conceivable that the first data bus subscriber does not rewrite the at least one read process data item into the same symbol, but only temporarily stores it and writes it into a symbol of the same data packet later present at this data bus subscriber so as to change the position of the at least one process data item in the data packet.

In an embodiment of the method according to the invention, the latter includes the reception of an instruction list on the first data bus subscriber from the local bus master. In this case, the local bus master can send the instruction list to each data bus subscriber, for example, via a communication in which no process data is sent to the data bus subscriber. For example, the local bus master can send the data bus subscribers the instruction lists in communication data packets. A communication data packet contains no process data. Advantageously, a communication data packet contains data, in particular for programming and/or for controlling and/or for monitoring and/or for identifying at least one data bus subscriber. Advantageously, the communication data packet has an address which is assigned to at least one data bus subscriber. Preferably, the data bus subscriber is set up to evaluate the address. If the communication data packet contains an instruction list, the data bus subscriber can store this instruction list. Subsequently, in a process data packet, i.e., in a communication in which the data bus subscriber is sent process data, the process data can be preceded by an instruction list index which indicates to the data bus subscribers which of the stored instruction lists to use. An instruction list index is thus assigned to an instruction list or vice versa, so that the instruction list to be used can be identified with the aid of the instruction list index. For this purpose, the instruction list index preferably has a value which is assigned to an instruction list, for example, the value indicates a specific instruction list or its memory location. For this purpose, the value itself may be the memory address where the instruction list is stored or where at least a first instruction of the instruction list is stored. Alternatively, or additionally, the value can also indicate a memory location in which the corresponding instruction list is stored. In the aforementioned cases, one can also speak of a direct assignment. The value of the instruction list index, however, can also be used, for example, as input of a Look-Up table (LUT). The value of the instruction list index is the input value of the conversion table. The output value of the conversion table can be the memory address of the first instruction in the associated instruction list or otherwise identify the instruction list. The conversion table can be stored in terms of software technology and hardware in the form of, for example, logic and indicate a one-to-one conversion from an input value to an output value, the output value giving an indication of the instruction list to be used. It depends on the conversion table as to how a relationship between the instruction list index and the instruction list is established. When using a conversion table, it is also possible to speak of an indirect assignment. In the direct and indirect assignment, however, the instruction list to be used, i.e., that can be found, by the data bus subscriber is uniquely identifiable via the instruction list index.

The above object is also achieved by a local bus having at least a first and a second data bus subscriber and a local bus master. In this case, the local bus master has a transmitter for sending a data packet with process data. The transmitter for sending may be, for example, a transmitter circuit or a transceiver circuit. The first data bus subscriber has a receiver for receiving the data packet with process data and a process unit for preprocessing at least one process data item of the received data packet and a transmitter for transmitting the data packet having the at least one preprocessed process data item to the second data bus subscriber. The receiver for receiving can be, for example, a receiver circuit and the transmitter for transmitting can be a transmitter circuit, or both may be formed as one or two separate transceiver circuits. The process unit for preprocessing may be, for example, a processor, a microcontroller or an arithmetic circuit, which may be formed in particular of gate elements of an integrated circuit. The arithmetic circuit can be embodied as digital logic, which is designed, in particular, at least as a part of a semiconductor chip. The circuits may be implemented in an application specific integrated circuit (ASIC) or field programmable (logic) gate array (FPGA).

The second data bus subscriber has a receiver for receiving the data packet with the at least one preprocessed process data item and a process unit for further processing the at least one preprocessed process data item. In this case, the receiver for receiving the data packet may be, for example, a receiver circuit or a transceiver circuit. The process unit for further processing may be, for example, a processor, a microcontroller or an arithmetic circuit, which may in particular be formed of gate elements of an integrated circuit. The arithmetic circuit can be designed as digital logic, which in particular is formed at least as part of a semiconductor chip. The circuits may be implemented in an ASIC or an FPGA.

The transmitted and received data packet can contain a multiplicity of symbols, wherein at any given time only one symbol of the data packet is present at a corresponding data bus subscriber. The transmitter for sending the data packet with the process data and the transmitter for sending the at least one preprocessed process data item are thus adapted to send symbol by symbol. Accordingly, the receiver for receiving the data packet with the process data and the receiver for receiving the at least one process data item are adapted to receive symbol by symbol. That is, a symbol of the data packet remains on the data bus subscriber only a certain time until this receives a new symbol from the upstream data bus subscriber and forwards the symbol that it just held to the downstream data bus subscriber. The symbol by symbol looping of the data packet through the data bus subscribers can be determined by the work cycle of the data bus subscribers, for example, after two work cycles, forwarding takes place or the forwarding can be triggered solely by receiving a new symbol.

The object underlying the invention is also achieved by a method for the distributed processing of process data in a local bus, in particular a ring bus, with at least two data bus subscribers and a local bus master. In this case, the method comprises determining the extent of the workload of the first data bus subscriber. The extent of the workload indicates whether the first data bus subscriber can execute preprocessing of process data for a second data bus subscriber within the work cycles available to this first data bus subscriber. That is, if the first data bus subscriber receives, for example, a symbol of a data packet and this symbol contains process data which does not cause any control or regulation on the first data bus subscriber, or if the data bus subscriber does not have to write any data coming from its sensor inputs into the symbol, then the workload of the first data bus subscriber with respect to this symbol is equal to zero. The first data bus subscriber and its computing capacities are accordingly free for the residence time of this symbol, for example measured in work cycles, and can be used for preprocessing. This means that the first data bus subscriber can perform preprocessing with the process data present in the symbol. In order to instruct the first data bus subscriber to perform corresponding preprocessing, at least one instruction list is generated, wherein the at least one instruction list comprises a set of instructions for preprocessing the process data by the first data bus subscriber, the instructions for preprocessing being dependent on the determination of the utilization. Depending on how much free computing capacity the first data bus subscriber has, the more preprocessing it can execute with symbols within the data packet. However, the generated instruction list may not only have instructions for preprocessing, but also have instructions for processing process data intended for the first data bus subscriber. That is, the generated instruction list includes instructions for some symbols which cause preprocessing, whereas for other symbols, in particular the symbols containing process data intended for the first data bus subscriber, processing of the corresponding process data is caused.

The generated instruction list will then be sent to the first data bus subscriber, for example, in an asynchronous communication, for example in a communication data packet. Subsequently, a process data packet with the process data is sent from the local bus master via the local bus.

The first data bus subscriber then executes the instructions of the instruction list, wherein an instruction is executed for each symbol, or even an instruction of the instruction list is executed for each bit in the corresponding symbol, wherein the instructions cause either a processing or preprocessing.

The object of the invention is also achieved by a local bus master of a local bus, in particular of a ring bus, with at least two data bus subscribers. In this case, the local bus master has a determinator for determining the workload of the first data bus subscriber, wherein the workload indicates whether the first data bus subscriber can perform a preprocessing of process data for a second data bus subscriber within the work cycle that is available to said first data bus subscriber. Furthermore, the local bus master has a generator for generating at least one instruction list, wherein the at least one instruction list comprises a set of instructions for preprocessing of the process data by the first data bus subscriber, wherein the instructions for preprocessing are dependent on the determination of the workload. In this case, the determinator for determining and the generator for generating may be, for example, a processor, a microcontroller or an arithmetic circuit, which may in particular be formed of gate elements of an integrated circuit. The arithmetic circuit can be designed as a digital logic, which is formed in particular at least as part of a semiconductor chip. The circuits may be implemented in an ASIC or an FPGA.

Furthermore, the local bus master has a transmitter for sending from the at least one instruction list to the first data bus subscriber, for example, in a communication data packet, and a transmitter for sending a data packet with process data, for example, a process data packet, via the local bus. The transmitter for sending the instruction list and the transmitter for sending the data packet may be the same or two separate components and the transmitter for transmission may be configured as, for example, a transmitter circuit or a transceiver circuit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
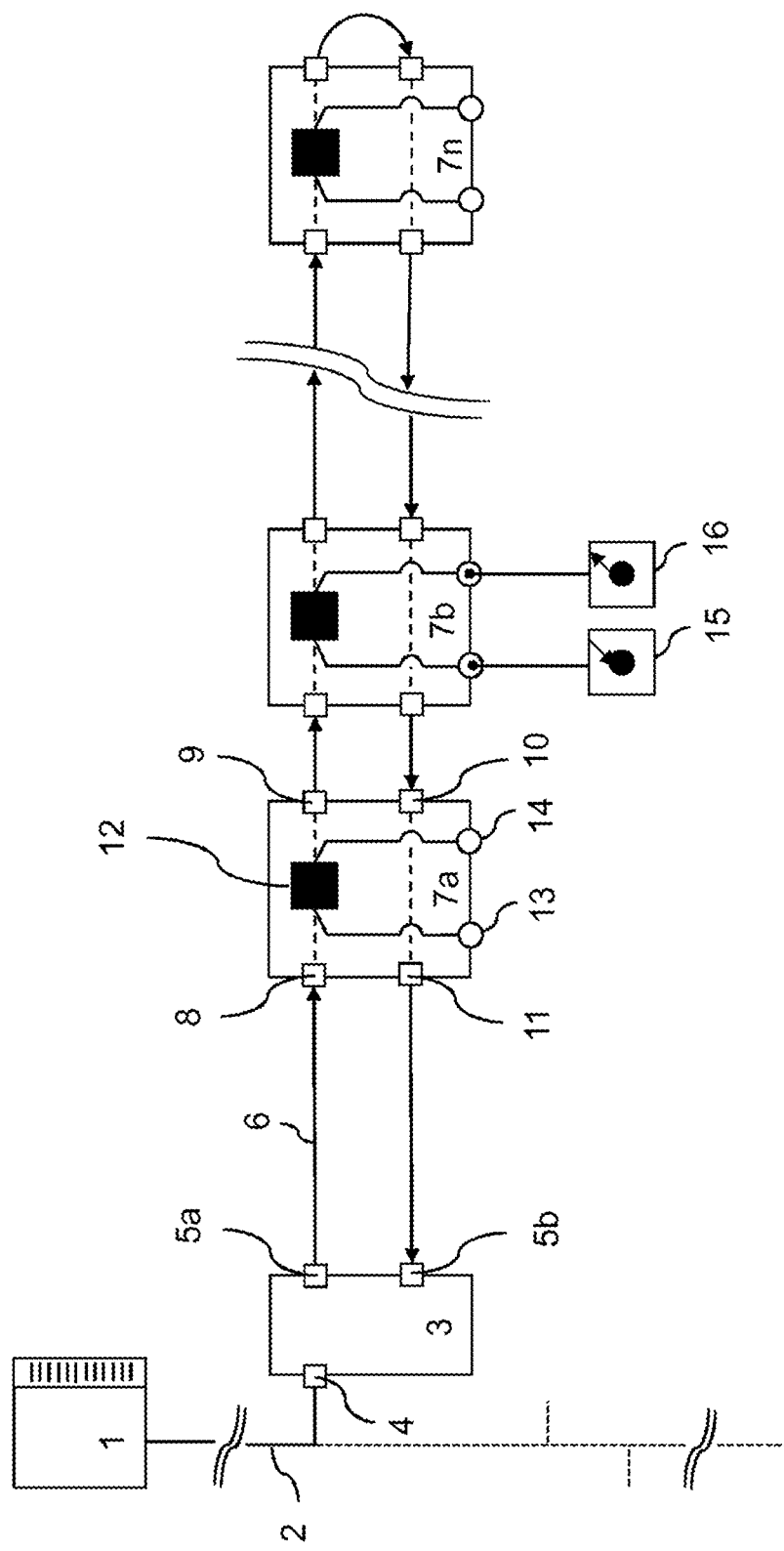
FIG. 1 is a schematic block diagram of an exemplary automation system with a programmable logic controller and an exemplary ring bus.

FIG. 1 shows a schematic block diagram of an automation system. It is understood by those skilled in the art that the automation system shown is only an example and all the elements, modules, components, subscribers and units belonging to the automation system can be configured differently but can nevertheless fulfill the basic functions described here.

The automation system shown in FIG. 1 has a higher-level control 1, which can be realized for example with a programmable logic controller, PLC. Such a PLC 1 basically serves to control and regulate the process performed by the automation system. Nowadays, however, PLCs 1 also assume advanced functions in automation systems such as visualization, alerts and recording of all data concerning the process and as such, the PLC 1 acts as a human-machine interface. There are PLC 1 in different performance levels, which have different resources (computing capacity, storage capacity, number and type of inputs and outputs, and interfaces) that enable the PLC 1 to control and regulate the automation system process. A PLC 1 usually has a modular design and is formed of individual components, each fulfilling a different task. Usually, a PLC 1 has a central unit (with one or more main processors and memory modules) and several modules with inputs and outputs. Such modular PLCs can be easily expanded by adding modules. It depends on the complexity of the process and the complexity of the structure of the automation system as to which modules must be integrated in the PLC 1. In today's automation systems, the PLC 1 is also usually no longer an independent system, but instead the PLC 1 is connected via corresponding interfaces to the Internet or intranet. That is, the PLC 1 is part of a network from or via which the PLC 1 can receive information, instructions, programming etc. For example, via a connection to a computer located on the intranet or Internet, the PLC 1 may obtain information about the materials supplied to the process, such that, for example, by knowing the number thereof or the nature, the process can be optimally controlled. It is also conceivable that the PLC 1 is controlled by an access from the intranet or Internet by a user. Thus, for example, a user with the aid of a computer, also called a host computer, can access the PLC 1 and check, change or correct its user programming. Accordingly, access to the PLC 1 is possible from one or more remote control stations or control centers. If necessary, the host computers can have visualization devices for displaying process sequences.

To control the process of the automation system, the PLC 1 is connected to automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which may be a field bus in the exemplary embodiment shown here. To the higher-level bus 2, however, not only the local bus master 3 of a local bus can be connected as in the embodiment shown here, but also any other subscribers which are designed for communication with the PLC 1.

The higher-level bus 2 is connected to the local bus master 3 in the exemplary embodiment shown here. For this purpose, the local bus master 3 has a first interface 4, which is designed such that it can be connected to the higher-level bus 2. For this purpose, the interface 4 can have, for example, a receptacle in the form of a socket and the higher-level bus 2 can have a plug which can be received by the socket. In this case, the plug and the socket, for example, can be a modular plug and a modular socket, i.e., each wire of the higher-level bus 2 is electrically or optically connected to a connection in the modular socket. However, the person skilled in the art also knows other ways in which an interface 4 is to be designed so that the local bus master 3 can be electrically or optically connected to the higher-level bus 2. The expert knows screw, turn, click or plug connections, with the help of which an electrical or optical connection can be made. In most cases, a male plug is accommodated by a female counterpart. This receptacle usually does not only produce the electrical or optical connection, but also ensures that the two parts are mechanically coupled and can only be released from each other again with the application of a certain force. But it is also conceivable that the higher-level bus 2 is hardwired to the interface 4.

The local bus master 3 in the embodiment shown here has a further second interface to connect the local bus master 3 with the local bus. Data bus subscribers 7a, 7b, ... 7n are connected to the local bus or form the same. The local bus is advantageously configured such that a data packet signal sent from the local bus master 3 is cycled through all data bus subscribers 7a, 7b, ..., 7n connected to the local bus and is transmitted back to the local bus master 3. Here, a data bus subscriber 7a, 7b, ..., 7n only receives a part of the data packet from its upstream data bus subscriber 7a, 7b, ..., 7n. After a period in which the data contained in this part of the data bus subscriber 7a, 7b, ..., 7n can be processed, the part is forwarded to the downstream data bus subscriber 7a, 7b, ..., 7n and at the same time, a new part of the data packet is received from the upstream data bus subscriber 7a, 7b, ..., 7n. In this way, all parts of the data packet sequentially cycle through all the data bus subscribers 7a, 7b, ..., 7n. The local bus is advantageously formed in an annular structure. Such local buses can also be referred to as a ring bus 6. Alternatively, the local bus can also be formed in a strand-shaped or star-shaped manner or from a combination or mixed form of the aforementioned. The transmission and reception of the data packets is accomplished via the second interface of the local bus master 3. In the embodiment shown here, the second interface is divided into a first part 5a and a second part 5b. The first part 5a of the second interface establishes the downlink in the ring bus 6 and the second part 5b of the second interface establishes the uplink in the ring bus 6.

The ring bus 6, whose data transmission direction is shown with arrows in the exemplary embodiment shown in FIG. 1, comprises the data bus subscribers 7a, 7b, ..., 7n in the embodiment shown here. These data bus subscribers 7a, 7b, ..., 7n each have an interface 8 in the embodiment shown here to receive data from an upstream or preceding data bus subscriber 7a, 7b, ..., 7n. In the case of data bus subscriber 7a, the latter receives data from the upstream local bus master 3 via the interface 8. Furthermore, the data bus subscribers 7a, 7b, ..., 7n in the embodiment shown here each have an interface 9 to forward data to a downstream or subsequent data bus subscriber 7a, 7b, ..., 7n. In the case of data bus subscriber 7a, the latter sends data to the downstream data bus subscriber 7b via the interface 9. The interfaces 8 and 9 serve to propagate data in the downlink direction of the ring bus 6, i.e., away from the local bus master 3. Further, the data bus subscribers 7a, 7b, . . . , 7n in this embodiment comprise interfaces 10 and 11 for propagating data in the uplink direction of the ring bus 6, i.e., towards local bus master 3. In the case of the data bus subscriber 7a, interface 10 is designed to receive data from the downstream or subsequent data bus subscriber 7b and interface 11 is adapted to forward data to the upstream or preceding data bus subscriber, here the local bus master 3. It can therefore also be said that the interfaces 9 and 11 are transmitter interfaces, whereas the interfaces 8 and 10 are receiver interfaces.

In the embodiment shown here, the connections of the interfaces and the PLC 1 or the data bus subscribers 7a, 7b, . . . , 7n are realized by means of cables or printed circuit boards for direct or indirect contacting by means of electrical contacts. Another alternative is that the individual connections are made wirelessly, and the interfaces provide the necessary conversions to the radio standards used.

Even if the local bus master 3 and the individual data bus subscribers 7a, 7b, . . . , 7n are shown spaced from each other in the embodiment shown here, i.e., the local bus master 3 is arranged decentralized from the data bus subscribers 7a, 7b, . . . , 7n, the person skilled in the art is aware that the data bus subscribers 7a, 7b, . . . , 7n and the local bus master 3—which also represents a data bus subscriber of the ring bus 6—can also be connected directly to one another. In this case, for example, contacts of a data bus subscriber can engage in appropriate receptacles or receptacle contacts of a directly adjacent data bus subscriber so as to establish an electrical connection between the data bus subscribers so that data can be sent in the downlink and uplink directions. For example, the data bus subscribers 7a, 7b, . . . , 7n can have receptacles on the side facing away from the master and have contacts on the side facing the master. If the data bus subscribers 7a, 7b, . . . , 7n are then lined up accordingly, the contacts of the one data bus subscriber 7a, 7b, . . . , 7n respectively engage in the receptacles of the other data bus subscriber 7a, 7b, . . . , 7n and an electrical connection can be made. The local bus master 3 then has corresponding contacts on the side which engage in the receptacles of the first data bus subscriber 7a so as to generate an electrical connection between the interfaces 5a and 8 or the interfaces 5b and 11. However, the person skilled in the art also knows of other possibilities, for example pressure contacts, blade and fork contacts, as to how two data bus subscribers 7a, 7b, . . . , 7n arranged directly next to one another can establish an electrical or optical connection.

In the case that the data bus subscribers 7a, 7b, . . . , 7n and the local bus master 3 are to be connected directly to each other, these can also have mechanical receptacles or mechanical fastener with which the individual data bus subscribers 7a, 7b, . . . , 7n and the local bus master 3 can be interconnected. Here, for example, a data bus subscriber 7a, 7b, . . . , 7n can have a projection on one side and an undercut on the other side. If the data bus subscribers 7a, 7b, . . . , 7n are then lined up, a projection engages in an undercut of the other data bus subscriber 7a, 7b, . . . , 7n, so that a mechanical coupling is produced. To simply string together the data bus subscribers 7a, 7b, . . . , 7n, these can also be arranged on a common receptacle, for example a DIN rail. For fixing on the DIN rail, the data bus subscriber 7a, 7b, . . . , 7n, can have corresponding fastener. Alternatively, or additionally, the data bus subscriber 7a, 7b, . . . , 7n can also, for example, have detachably connected fastener with which the data bus subscriber 7a, 7b, . . . , 7n can be attached either to the DIN rail or to another receptacle.

For this purpose, the releasably connectable fastener can be exchanged and a corresponding fastener for the desired receptacle can be connected with the data bus subscribers 7a, 7b, . . . , 7n so that they can be attached to the desired receptacle.

Further, the data bus subscribers 7a, 7b, . . . , 7n in the exemplary embodiment shown in FIG. 1 also have a processing unit 12. This processing unit 12 can be an arithmetic logic unit or another type of arithmetic unit with which data can be processed. The processing unit 12 is preferably an integral part of the data bus subscriber 7a, 7b, . . . , 7n, to ensure particularly rapid and time-synchronized processing of data.

The processing unit 12 may also be referred to as the overall circuit of the data bus subscriber. That is, the processing device 12 receives data via the inputs 8 and 10 and outputs data to the outputs 9 and 11. Furthermore, the processing device 12 can receive or output data from the inputs and outputs 13 and 14. Furthermore, the processing unit 12 has access to a memory of the data bus subscriber 7a, 7b, . . . , 7n in which, for example, data, process data, or instruction lists are stored.

The processing unit 12 may be configured to process received data and to output data. Data to be processed can be received either from an upstream data bus subscriber or from inputs 13 of the data bus subscriber 7a, 7b, . . . , 7n. The inputs 13 of the data bus subscriber 7a, 7b, . . . , 7n can be connected to sensors 15, which, for example, send measurement data, status data, etc. Processed data may be output either to a downstream data bus subscriber or to outputs 14 of the data bus subscriber 7a, 7b, . . . , 7n. In this case, the outputs 14 of the data bus subscriber 7a, 7b, . . . , 7n can be connected to actuators 16, which perform a specific action, for example, using the data directed to them.

For the sake of simplicity, in the embodiment shown here, the data bus subscribers 7a, 7b, . . . , 7n are shown with only one input 13 and one output 14, and only data bus subscriber 7b is connected to sensor 15 and actuator 16. However, it is known to the person skilled in the art that the data bus subscribers 7a, 7b, . . . , 7n can have a plurality of inputs and outputs 13 and 14 and can be connected to a multiplicity of different sensors 15 and actuators 16. In this case, the feature characterizing the sensors 15 is that the sensors 15 receive data or signals and send them to the data bus subscribers 7a, 7b, . . . , 7n, whereas actuators 16 receive data or signals from the data bus subscribers 7a, 7b, . . . , 7n and perform an action based on these data or signals.

Alternatively, the interfaces 8, 9, 10 and 11 can be integrated in a module unit and the data bus subscribers 7a, 7b, . . . , 7n can be plugged onto that module unit. The module units can also be referred to as basic elements of the ring bus 6. The ring bus infrastructure is constructed by the module units and the data bus subscribers 7a, 7b, . . . , 7n are interchangeable, so that the ring bus 6 can be constructed with any data bus subscriber 7a, 7b, . . . , 7n. With the help of module units, it is also ensured that even if a data bus subscriber 7a, 7b, . . . , 7n is removed, the communication between the remaining data bus subscribers 7a, 7b, . . . , 7n is not interrupted because the communication is done via the module unit remaining in the ring bus.

The data bus subscribers 7a, 7b, . . . , 7n shown in this embodiment are also often called I/O modules due to their inputs and outputs 13, 14 that can be connected to sensors 15 or actuators 16. Even if the data bus subscribers 7a, 7b, . . . , 7n in the embodiment shown here are shown as spatially separated from the sensors 15 or actuators 16, the sensors 15 or actuators 16 can also be integrated in the I/O module.

The data bus subscribers 7a, 7b, ..., 7n are used for controlling or monitoring a process, in particular by outputting control signals, for example to actuators 16 and/or by receiving measurement signals, for example from sensors 15. The data bus subscribers 7a, 7b, ..., 7n convert the control signals and/or measurement signals into process data for the local bus 6 or vice versa.

The ring bus 6 shown in the embodiment shown here is based on a cycle frame communication. A cycle frame can be defined, for example, as a recurring (cyclic) preferably equidistant time interval in which data is transferable on the ring bus 6. The cycle frame has, for example, at least one start identifier (SOC) and one time range for the transfer of data. Multiple start identifiers (SOC) of consecutive cycle frames are advantageously located at a temporally equidistant distance from each other. The said time range is intended for the transmission of the data which can be transmitted within the cycle frame in the form of data packets. The start identifier (SOC) and the data packets are transmitted via the ring bus 6 and cycle through all the data bus subscribers 7a, 7b, ..., 7n. Advantageously, the cycle frame is initiated by the local bus master 3 in the ring bus 6. The start identifier (SOC) can be transmitted separately, i.e., as an independent symbol, or is advantageously contained in a start data packet (SOC packet).

Within the time range of the cycle frame, none, one or more data packets are transmitted. Advantageously, idle data is inserted in a cycle frame, in particular adjacent to at least one data packet. Advantageously, the transmission of the data packets and/or the idle data causes an uninterrupted signal on the ring bus 6. The signal allows for the data bus subscribers 7a, 7b, ..., 7n to synchronize to this time. Advantageously, the cycle frame additionally has a trailer. The trailer has a variable length and preferably follows the time range for data transmission up to the next start identifier (SOC) of the next cycle frame. Advantageously, the trailer contains idle data.

Data packets are sent within the cycle frames from the local bus master 3. In this case, the local bus master 3 sends, for example, parts of the data packet to the first data bus subscriber 7a of the ring bus 6 in the downlink direction. The first data bus subscriber 7a receives a first part of the data packet via the interface 8. Such a part of the data packet is also referred to below as a piece or unit. The data bus subscriber 7a, 7b, ..., 7n then performs a processing of the part, and then passes the part to the next data bus subscriber 7a, 7b, ..., 7n via interface 9; preferably simultaneously, the first data bus subscriber 7a, 7b, ..., 7n receives a second part of the data packet, etc. The size of the parts of the data packet, i.e., the division of the data packet, depends on the capacity of the data bus subscribers 7a, 7b, ..., 7n, for example a fixed number of bits, such as only 8 bits of the data packet can be present at the data bus subscriber 7a, 7b, ..., 7n for processing at the same time. If process data is contained in the part of the data packet, then the data bus subscriber 7a, 7b, ..., 7n can process this according to its instruction list. Subsequently, this part (these 8 bits) of the data packet are forwarded from the interface 9 to the next data bus subscriber 7a, 7b, ..., 7n, in the embodiment shown here, data bus subscriber 7b. The data bus subscriber 7b in turn has its own instruction list for processing this part of the process data, wherein the instruction lists of the data bus subscribers 7a and 7b can be different. The timing with respect to the processing time may be based on a timing predetermined by the local bus master 3. In this case, internal clock generators of the data bus subscriber 7a, 7b, ..., 7n can be synchronized with the timing of the local bus master 3.

The data packets of a cycle frame accordingly cycle through the data bus subscribers 7a, 7b, ..., 7n unit by unit, piecemeal or partwise, for example, in parts or symbols of 8 bits. The part of the data packet which has been processed by the last data bus subscriber, in the embodiment shown here data bus subscriber 7n, then passes through the ring bus 6 in the uplink direction, so that starting from the last data bus subscriber 7n, the parts are sent upwards again towards the local bus master 3 through all data bus subscribers 7a, 7b, ..., 7n. For this purpose, the last data bus subscriber 7n either has a switchable bridge that connects the interface 9 to the interface 10, or a switchable bridge is attached to the last data bus subscriber 7n, which takes over the function of passing parts of the cycle frame from the interface 9 to the interface 10. Alternatively, the interface 10 of the data bus subscriber 7n can also be connected directly to the interface 5b of the local bus master 3 with the aid of a bypass line.

In the uplink direction, the units of the cycle frame or of the data packets, as in the exemplary embodiment shown here, can be looped back to the local bus master 3 through the individual data bus subscribers 7a, 7b, ..., 7n, without any further processing taking place. However, it is also conceivable that processing of the units takes place again in the uplink direction, so that the units can be processed twice, once in the downlink direction to the last data bus subscriber 7n and once in the uplink direction to the local bus master 3. For example, processing may take place as a signal refresh and/or phase shift in the uplink direction.

Figures 4A, 4B:
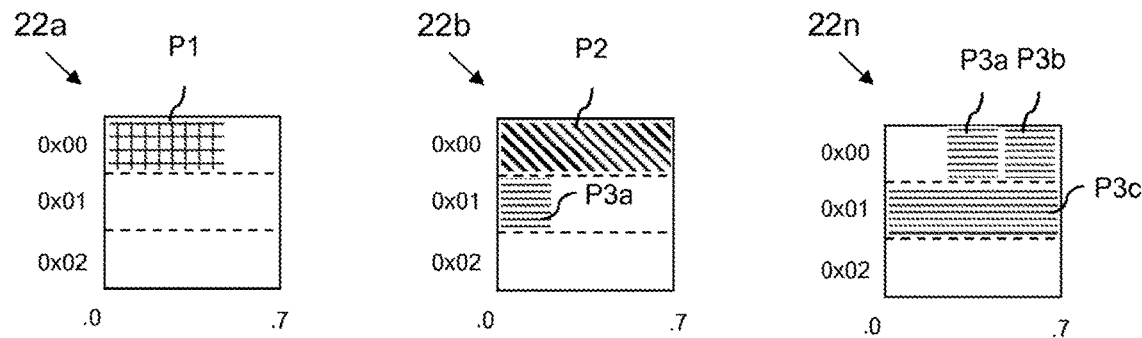
FIG. 4a instruction lists of the exemplary data bus subscribers of the ring bus shown in FIG. 1 for processing the process data of the data packet shown in FIG. 2.
FIG. 4b is a schematic representation of memories in the exemplary data bus subscribers of the ring bus shown in FIG. 1 for holding process data.

The processing of the data packets is carried out with the aid of instruction lists—as shown by example in FIG. 4a—, wherein the instruction lists sets include instructions which can be performed by the processing unit 12 of the data bus subscriber 7a, 7b, ..., 7n. The instruction lists themselves may be sent to each data bus subscriber 7a, 7b, ..., 7n from the local bus master 3 in an initialization phase. The instruction lists in this case have sets of instructions, which define the processing and preprocessing to be performed by the data bus subscribers 7a, 7b, ..., 7n. With the aid of the instruction lists, the processing of process data can be distributed to a plurality of data bus subscribers 7a, 7b, ..., 7n.

An embodiment of this distributed processing of process data will be described below with reference to FIGS. 2 to 4. In this case, the described embodiment is to be understood as exemplary only and the person skilled in the art is aware that it is also possible to deviate from this exemplary embodiment without deviating from the basic concept of the invention.

Figure 2:
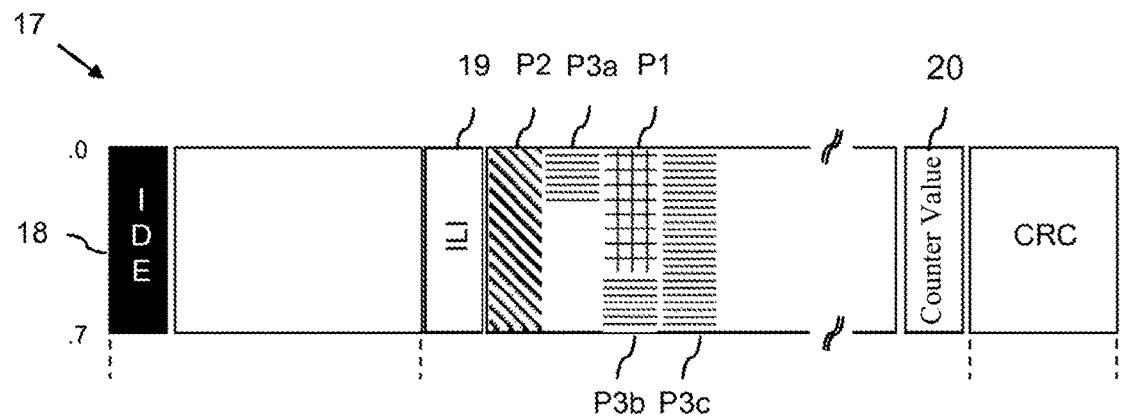
FIG. 2 is a schematic representation of a data packet with process data used by a local bus master.

FIG. 2 shows a schematic representation of a data packet 17 generated by a local bus master 3 with process data P1, P2, P3. The data packet 17 shown has a general header, an information part and a checksum part (CRC value).

The header includes a field 18 which contains a unique one-time pattern IDE which may also be referred to as a codeword or identifier. The number and the configuration of unique bit patterns or codewords depend on the coding used on the ring bus 6. Alternatively, or additionally, however, special bit patterns or codewords can also be defined in the bus protocol used. It is only of importance that the data bus subscribers 7a, 7b, ..., 7n can uniquely identify from the bit pattern or codeword of the field 18 as to what type of data packet 17 it is. In the embodiment shown here, the data bus subscribers 7a, 7b, ..., 7n have knowledge that if a field 18 with a bit pattern IDE is received, that it is a data packet 17, which carries process data P1, P2, P3.

The header may also include other information indicating, for example, whether the data packet 17 is moving in the downlink or the uplink direction. For this purpose, for example, the last data bus subscriber 7n can write the information into the header that the data packet 17 has already passed through this data bus subscriber 7n and was sent back towards local bus master 3. Furthermore, the header can also contain information about the length of the data packet 17 so that the data bus subscriber 7a, 7b, ..., 7n can check 17 the integrity of the data packet and have knowledge as to how many parts of the data packet 17 are still to be received from the data bus subscriber 7a, 7b, ..., 7n before a new data packet 17 starts. The skilled person also knows of other fields which can be written into a header portion of a data packet 17, which can be used for the control or error detection by the data bus subscribers 7a, 7b, ..., 7n.

The information part of the data packet 17 may first have an instruction list index field 19, ILI, which indicates which instruction list the data bus subscribers 7a, 7b, ..., 7n should use. For example, in the normal operation of the ring bus 6, it may be provided that all data bus subscribers 7a, 7b, ..., 7n use their first instruction list, whereas in the event of an error, the second instruction list is to be used. In this case, the instruction list index can point directly to the memory location of the instruction list stored in the data bus subscribers 7a, 7b, ..., 7n, or the instruction list index can have a value with which the data bus subscriber 7a, 7b, ..., 7n can find the corresponding instruction list, for example, via a conversion table. The information part further comprises the actual process data P1, P2 and P3. This process data P1, P2, P3 is shown in the embodiment shown here with different patterns. In the embodiment shown here, the process data P1 is intended for the data bus subscriber 7a in the ring bus 6, the process data P2 is intended for the data bus subscriber 7b in the ring bus 6 and the process data P3 is intended for the data bus subscriber 7n in the ring bus 6. In this case, the process data P3 is divided into three parts P3a, P3b, and P3c.

The positioning of the process data P1, P2, P3 in the information part of the data packet 17 is predetermined by the local bus master 3. For example, the local bus master 3 copies the process data P1, P2, P3 contained in the controller 1 to the data packet 17 without a sequence change. That is, for the accelerated conversion of the data stream contained in the controller 1 into data packets 17, the local bus master 3 does not change the order of the process data P1, P2, P3.

In the embodiment shown here, the data packet 17 is divided into symbols of 8 bits each. Even divided like this, the data packet 17 is received and processed by the data bus subscribers 7a, 7b, ..., 7n. That is, first, the local bus master 3 sends the symbol or field IDE 18 to the first data bus subscriber 7a; after a predetermined time, the local bus master 3 sends another symbol of the header of the data packet 17 to the data bus subscriber 7a, this in turn simultaneously sends the symbol or field IDE 18 to the data bus subscriber 7b. In this way, all parts of the data packet 17 cycle through the respective data bus subscribers 7a, 7b, ..., 7n, wherein at any given time each data bus subscriber 7a, 7b, ..., 7n always holds only a piece or portion of the data packet 17 and thus, is able to process it.

Furthermore, in the information part, the data packet 17 has a field 20, which may be configured as a counter value, and which can be incremented or decremented by each data bus subscriber 7a, 7b, ..., 7n through which this part of the data packet 17 has already been routed. The counter value of the field 20 can be used by the local bus master 3 in order to verify that the data packet 17 has passed through all data bus subscribers 7a, 7b, ..., 7n.

The symbol by symbol passage of the data packet 17 through the data bus subscribers 7a, 7b, ..., 7n means for the data bus subscriber 7n, for example, that it first receives the process data P3a in a symbol; in a further symbol, it receives the process data P3b and in a further symbol, the process data P3c. If the data bus subscriber 7n can only perform a control, regulation or processing together with the process data P3a and P3b, then the data bus subscriber 7n must first cache the process data P3a before the process data P3b is present upon receipt of the further symbol. If the process data P3b is available, the data bus subscriber 7n must utilize processing power and work cycles to first read out the cached process data P3a from the memory before processing can take place.

Figure 3:
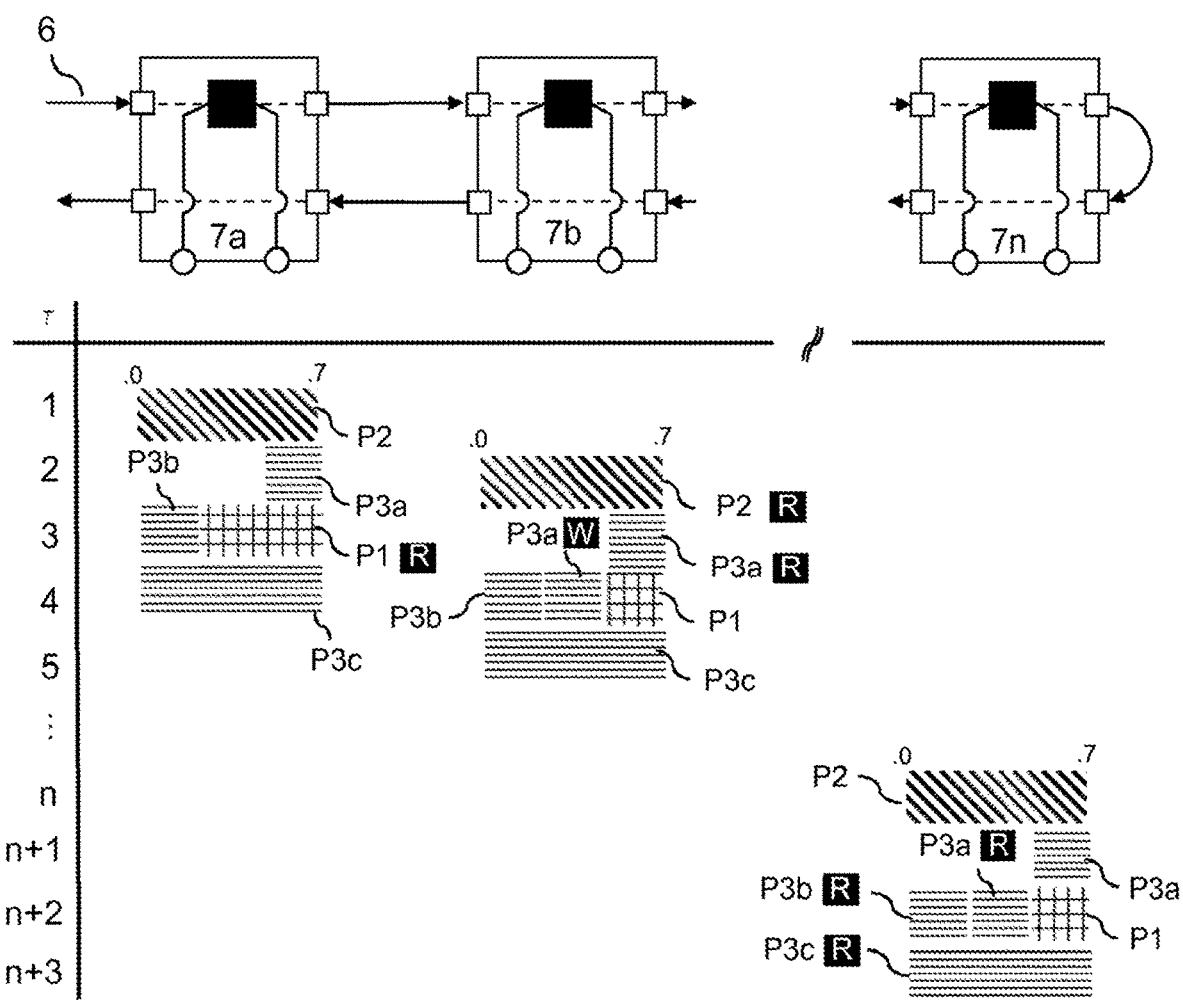
FIG. 3 is an exemplary timing diagram showing the cycling of the data packet shown in FIG. 2 through the exemplary data bus subscribers of the ring bus shown in FIG. 1.

With the preprocessing according to the invention, this overhead can be minimized for the data bus subscriber 7n, as shown in FIG. 3, namely by preprocessing the process data P3a by a data bus subscriber 7a, 7b, which is located upstream of the data bus subscriber 7n in the ring bus 6.

FIG. 3 schematically shows in a time diagram how symbols of the information part of the data packet 17—as shown in FIG. 2—cycle through the exemplary data bus subscribers 7a, 7b, ..., 7n of the ring bus 6 and which processing or preprocessing steps are executed by the respective data bus subscribers 7a, 7b, ..., 7n.

At the time $\tau=1$, only the data bus subscriber 7a has received the process data P2 from the local bus master 3. In the exemplary embodiment shown here, the process data P2 fill out the entire symbol of the data packet 17. With this process data P2, however, the data bus subscriber 7a does not perform any processing or preprocessing. It can also be said that this process data P2 is not intended for the data bus subscriber 7a. Accordingly, the data bus subscriber 7a can have a "SKIP" instruction for this process data P2 or a "SKIP" instruction in its instruction list for each bit of the symbol or have no instructions. Nevertheless, the process data P2 remains a predetermined time at the data bus subscriber 7a before the data bus subscriber 7a forwards the process data P2 to the data bus subscriber 7b. This ensures a deterministic behavior of the ring bus 6, i.e., a predictable temporal behavior of the ring bus 6, because each symbol remains a predetermined time at the respective data bus subscriber 7a, 7b, ..., 7n, wherein this predetermined time is preferably the same for all data bus subscribers 7a, 7b, ..., 7n and can be based on a predetermined timing of the local bus master 3. When sending the process data P2 to the data bus subscriber 7b at $\tau=2$, the data bus subscriber 7a receives the process data P3a in another symbol of the data packet 17. In the embodiment shown here, the process data P3a or the process data item P3a correspond to only a certain part of the symbol of the data packet 17. For example, the process data item P3a may be only one bit in the symbol.

That is, at $\tau=2$, the process data P2 has already passed through the data bus subscriber 7a and the latter currently holds the symbol with the process data P3a, wherein the data bus subscriber 7b holds the process data P2. Since this process data P2 is intended for this data bus subscriber 7b, said data bus subscriber 7b reads the process data P2 and with it carries out control, regulation or processing. The reading of the process data P2 is designated with an "R" (Read). Subsequently, the data bus subscriber 7b forwards the symbol of the data packet 17 comprising the process data P2 to the subsequent data bus subscriber, for example the data bus subscriber 7n.

At τ=3, the data bus subscriber 7a has received the next symbol of the data packet 17 from the local bus master 3. This symbol contains the process data P3b and the process data P1. Since the process data P1 is intended for the data bus subscriber 7a, the latter reads the process data P1. In this case, the data bus subscriber 7a can either read the entire symbol, or the instructions in the instruction list can instruct the data bus subscriber 7a not to read the part of the symbol in which the process data P3b is located and instead read only the part in which the process data P1 is contained. The reading of the process data P1 is marked with "R". This process data P1 can cause a control, regulating, on the data bus subscriber 7a, or this data bus subscriber 7a can perform a processing with this process data P1. At the same time, the data bus subscriber 7b has the symbol with the process data P3a. This symbol with the process data P3a has been sent to the data bus subscriber 7b by the data bus subscriber 7a. Even if the process data P3a is not intended for the data bus subscriber 7b, the latter may have at least one instruction for this symbol in its instruction list, which causes the data bus subscriber 7b to read the process data P3a or the one process data item P3a from the symbol and to save it. The reading of the process data P3a is marked with "R".

At τ=4, the data bus subscriber 7a has received the next symbol of the data packet 17 from the local bus master 3. This symbol contains the process data P3c. The data bus subscriber 7a does not carry out any processing with this process data P3c, i.e., the data bus subscriber 7a can have a corresponding "SKIP" instruction for this symbol or a corresponding "SKIP" instruction in its instruction list for each bit of the symbol. At the same time, the data bus subscriber 7b has received the symbol from the data bus subscriber 7a, which contains the process data P1 and P3b. The instructions of the data bus subscriber 7b can cause the latter to write the process data P3a read at the time τ=3 into the currently present symbol. The writing is designated with "W" (Write). In the embodiment shown here, the process data P3a is written into the symbol next to the process data P3b. For this purpose, the process data P1 is overwritten. This is possible because the process data P1 has already been read by the data bus subscriber 7a and is no longer needed. However, it is also clear to the person skilled in the art that the overwriting of process data can be prevented by known mechanisms. However, it can also already be implemented in the generation of the instruction lists that no process data is overwritten or at least ensured that only process data that is no longer needed is overwritten. After the process data P3a has been written into the symbol by the data bus subscriber 7b, this changed symbol is passed through the ring bus 6.

The re-storing of the process data P3a by the data bus subscriber 7b illustrates a preprocessing according to the invention. Here, the data bus subscriber 7b has processed process data, which is not intended for this data bus subscriber 7b, the re-storing of which, however, saves work cycles for a downstream data bus subscriber, in the embodiment shown here, data bus subscriber 7n, because the latter no longer needs to perform a re-storing. This becomes clear in the continuation of the time diagram.

At τ=n, the data bus subscriber 7n receives the first symbol of the data packet 17. Since this does not contain process data intended for this particular data bus subscriber 7n, the data bus subscriber 7n can skip this symbol. The instruction list of the data bus subscriber 7n can therefore contain one or more corresponding "SKIP" instructions.

At τ=n+1, the data bus subscriber 7n receives another symbol of the data packet 17, namely the symbol with the process data P3a. However, this process data P3a is not read by the data bus subscriber 7n because it has already been re-stored by on the data bus subscriber 7b into the following symbol. That is, the data bus subscriber 7n does not need to use the work cycles it has available at τ=n+1 to read the process data P3a but instead, the data bus subscriber 7n can utilize its spare capacity elsewhere, for example in order to perform processing or preprocessing for the local bus master 3 to which the data bus subscriber 7n returns the symbols.

At τ=n+2, the data bus subscriber 7n then receives the symbol of the data packet 17 that was changed by the data bus subscriber 7b, into which the process data P3a was re-stored. From this symbol, the data bus subscriber 7n can then read the process data P3a and P3b. The reading of the process data P3a and P3b is marked with "R". The data bus subscriber can thus read the process data P3a and P3b in one step.

At τ=n+3, the data bus subscriber 7n then receives another symbol of the data packet 17 from which the data bus subscriber 7n can read the process data P3c. The reading is marked with "R".

FIG. 4a shows the instruction lists 21a, 21b, 21n of the data bus subscribers 7a, 7b, . . . , 7n. In the illustrated embodiment, the instruction lists 21a, 21b, 21n are shown as tables. In the embodiment shown here, each row of the tables contains two instructions that can be executed with the symbol of the data packet 17 currently pending at the data bus subscriber 7a, 7b, . . . , 7n. The person skilled in the art is aware, however, that even if only two instructions for two work cycles are shown here by way of example, a different number of instructions per symbol can also be executed. Furthermore, it is clear to the person skilled in the art that the instruction lists 21a, 21b, 21n may also have a dedicated instruction for each bit in the symbol. For the sake of simplicity and for the sake of clarity, it has been omitted here to specify corresponding instructions for each bit.

The first row of the instruction list 21a of the data bus subscriber 7a is empty, which is marked with " - - - ", i.e., the data bus subscriber 7a does not carry out any processing of the first symbol of the data packet 17 received by this data bus subscriber 7a because there is no instruction. Instead of empty instructions, the instruction list 21a may also have "SKIP" instructions at this point. The second line of the instruction list 21a is also empty, i.e., no processing is carried out with the second symbol received by the data bus subscribers 7a. The first two symbols of the data packet 17 remain at the data bus subscriber 7a only for a predetermined amount of time without any processing being carried out. Only for the third received symbol does the instruction list 21a have an instruction, namely Read "R", specifically, the process data P1. The process data P1 may be specified, for example, as a bit or bit range such as a maximum of 8 bits corresponding to a symbol of the data packet 17. As the second instruction to be executed for this symbol, the instruction list 21a has a Write "W", namely the read process data P1 into the memory of the data bus subscriber 7a and into memory address 0x00. Otherwise, the instruction list 21a has no further instructions. That is, the data bus subscriber 7a reads the process data P1 from the third symbol received by this data bus subscriber 7a and writes it into its memory. The other lines shown in the instruction list 21 are empty, i.e., no more processing is carried out. However, it is known to the person skilled in the art that the instructions shown here are only to be understood as examples and that other instructions can also be included in the instruction list 21a.

The instruction list 21b is stored in the data bus subscriber 7b. Right in the first line, the former has two instructions, namely "R" for Read, specifically the process data P2 from the first symbol, and "W" for Write, specifically the read process data P2 into the memory at memory address 0x00. The skilled person is aware, even if for the sake of simplicity, that the process data here is designated with its reference numerals from FIG. 2, the instructions may indicate exactly the bit range in the symbol from which to read, or that the process data P2 is otherwise identifiable. After processing these two instructions, the symbol is forwarded to the downstream data bus subscriber 7n and at the same time, a new symbol is received by the upstream data bus subscriber 7a. For this second symbol, the instruction list 21b of the data bus subscriber 7b has the instructions "R" for Read, namely process data P3a, and "W" for Write, namely the read process data P3a into the memory at the memory address 0x01. After execution of these two instructions, the symbol is forwarded to the downstream data bus subscriber 7n and at the same time a new symbol is received by the upstream data bus subscriber 7a. For this symbol, the instruction list in turn contains two instructions, namely "R" for Read, specifically the process data P3a from the memory at memory address 0x01 and "W" for Write, namely the read process data P3a into the symbol. It can be specified here where the process data P3a should be written into the symbol. That is to say, the data bus subscriber 7b carries out a re-storing of the process data P3a into the data packet 17, namely from one symbol of the data packet 17 to another symbol of the data packet 17. For this purpose, the data bus subscriber 7b first caches the process data P3a and then writes this into a following symbol. Even if the re-storing shown here is into a directly following symbol, the person skilled in the art is aware that the re-storing can also take place into any following symbol. Furthermore, it is also clear to the person skilled in the art that even if only one re-storing is shown here, the data bus subscriber 7b can carry out unlimited processing with the process data P3a within the scope of the prescribed work cycles. The processing includes, for example, "AND" or "OR" links of the process data P3a. The further lines of the instruction list are empty so that the data bus subscriber 7b does not carry out further processing. But even this is only due for the sake of clarity of the embodiment shown here and should not be construed as limiting.

The instruction list 21n is stored in the data bus subscriber 7n. The first two lines of this instruction list 21n are empty, so that the data bus subscriber 7n performs no processing for the first two symbols of the data packet 17. Nevertheless, these two symbols each remain on the data bus subscriber 7n for a certain predetermined time before it sends the symbols back to the local bus master 3, either back through the data bus subscribers 7a and 7b or via a bypass line. Only for the third symbol received from data bus subscriber 7n does the instruction list 21n include corresponding instructions, namely "R" for Read, specifically the process data P3a and P3b. This process data P3a and P3b can now be read from the one symbol, because a re-storing of the process data P3a by the data bus subscriber 7b into the corresponding symbol has taken place. This allows for the data bus subscriber 7n to use the work cycles at its disposal in the second symbol, where the data bus subscriber 7n otherwise would have had to read the process data P3a, elsewhere. The read process data P3a and P3b is then subsequently written into the memory by the instruction "W", that is to say Write, namely into memory address 0x00. After execution of these two instructions, the symbol is forwarded to the local bus master 3 and at the same time, a new symbol is received from the upstream data bus subscriber 7b. From this symbol, the data bus subscriber 7n reads the process data P3c using the instruction "R" and shifts this process data P3c into its memory at memory address 0x01 using the instruction "W". The instruction list 21n may contain any number of further instructions.

The skilled worker is aware that even if the instruction lists 21a, 21b, 21n are given as readable tables in the embodiment shown here, that depending on the memory use in the data bus subscribers 7a, 7b, . . . , 7n, the instruction lists 21a, 21b, 21n may be more or less complex, from programming code in a high-level programming language down to the machine language, i.e., instructions that can be directly executed by the processing unit 12 of the data bus subscribers 7a, 7b, . . . , 7n. In this case, the machine code of the machine language includes a sequence of bytes or words that can represent both commands and data. When generating the instruction lists, the local bus master 3 can immediately send the latter to the appropriate data bus subscribers 7a, 7b, . . . , 7n in machine code, or send them the instruction lists in the form of program code, which is individually compiled by the data bus subscribers 7a, 7b, . . . , 7n and is converted to machine language. If the local bus master 3 sends the data bus subscribers 7a, 7b, . . . , 7n the instruction lists in the form of machine language right away, this has the advantage that the data bus subscribers 7a, 7b, . . . , 7n do not need a complicated processing unit 12 because they do not need to be able to compile the received instruction lists. However, if more complex data bus subscribers 7a, 7b, . . . , 7n are used, then compilation on the data bus subscriber 7a, 7b, . . . , 7n itself may be advantageous because in this case the local bus master 3 needs no knowledge of the hardware of the data bus subscriber 7a, 7b, . . . , 7n. The skilled person, however, recognizes that the complexity of the instruction lists is adjustable to the complexity of the data bus subscribers 7a, 7b, . . . , 7n.

It is also clear to the person skilled in the art that even if only individual instructions have been given here, which always refer to an entire symbol, a separate instruction can also be present for each process data item in the symbols, i.e., for each bit. In this case, it can also be said that bit-granular processing or preprocessing takes place.

The process data P1, P2, P3 read by the instruction lists 21a, 21b, and 21n are written into the memories of the data bus subscribers 7a, 7b, . . . , 7n, specifically at the memory addresses defined by the instructions. An example of the memories 22a, 22b, 22n of the data bus subscribers 7a, 7b, . . . , 7n is shown in FIG. 4b.

The process data P1 read by the data bus subscriber 7a from the third symbol of the data packet 17 is stored at the memory address 0x00 of the memory 22a.

The process data P2 read from the first symbol of the data packet 17 by the data bus subscriber 7b is stored at the memory address 0x00 of the memory 22b. The process data P3a read from the second symbol of the data packet 17 is stored at the memory address 0x01 of the memory 22b. After the process data P3a has been written into the third symbol of the data packet 17, this memory address can be released again and the process data P3a be deleted at this memory address or be overwritten in the following.

The process data P3a read by the data bus subscriber 7n from the third symbol of the data packet 17 that was previously placed by data bus subscriber 7b at this location in the data packet 17 is stored at the memory address 0x00 of the memory 22n, as well as the process data P3b. The process data P3c, which was read from the fourth symbol of the data packet 17 was stored at the memory address 0x01 of the memory 22n.

It is known to the person skilled in the art that the memory locations shown here and the read and written process data P1, P2, P3a, P3b, P3c are to be understood only as examples.

It will also be appreciated by those skilled in the art that where memory is referred to herein, memory may include all types of storage. It is only important that the data bus subscribers 7a, 7b, . . . , 7n have access to the stored data, i.e., for example, that they have access to a memory. Correspondingly, the data can be stored, for example, in the data bus subscribers 7a, 7b, . . . , 7n themselves, for example in a memory 22a, 22b, 22c of the data bus subscribers 7a, 7b, . . . , 7n, or a memory connected individually or collectively with the data bus subscribers 7a, 7b, . . . , 7n. The connection between the data bus subscribers 7a, 7b, . . . , 7n and the memory or the memories 22a, 22b, . . . , 22n may in this case be done wired or wirelessly. It is also conceivable that the memories 22a, 22b, . . . , 22n are configured as a plugin which is connected to the data bus subscribers.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the distributed processing of process data in a local bus with a local bus master and at least two data bus subscribers, the method comprising:
   sending a data packet with the process data from the local bus master via the local bus;
   receiving the data packet at a first data bus subscriber of the at least two data bus subscribers, the process data including at least one process data item for a second data bus subscriber of the at least two data bus subscribers;
   preprocessing at least one process data item of the process data in the data packet by the first data bus subscriber;
   sending the data packet with the at least one preprocessed data item via the local bus through the first data bus subscriber to the second data bus subscriber;
   receiving the data packet with the at least one preprocessed data item at the second data bus subscriber; and
   further processing the at least one preprocessed data item by the second data bus subscriber.

2. The method according to claim 1, wherein the preprocessing comprises writing the at least one process data item into the data packet.

3. The method according to claim 1, wherein the preprocessing comprises reading the at least one process data item from the data packet.

4. The method according to claim 1, wherein the data packet comprises a plurality of symbols, each symbol having a plurality of bits.

5. The method according to claim 4, wherein the receiving of the data packet with the process data comprises symbol by symbol receiving of the data packet by each data bus subscriber of the at least two data bus subscribers.

6. The method according to claim 4, wherein the preprocessing comprises a bit-granular preprocessing of a received symbol of the plurality of symbols.

7. The method according to claim 6, wherein the bit-granular preprocessing comprises performing a bit operation on at least one bit of the received symbol to obtain the at least one preprocessed process data item.

8. The method according to claim 4, wherein the preprocessing comprises:
   reading the at least one process data item from a symbol of the data packet; and
   writing the at least one process data item into the symbol of the data packet or into a following symbol of the data packet.

9. The method according to claim 4, wherein the preprocessing comprises:
   executing instructions of an instruction list for the preprocessing of the at least one process data item, wherein a fixed number of instructions from the instruction list is performed for each symbol of the plurality of symbols.

10. The method according to claim 9, further comprising:
    receiving the instruction list at the first data bus subscriber from the local bus master.

11. The method according to claim 1, wherein the preprocessing is performed by the first data bus subscriber within work cycles available on the first data bus subscriber before forwarding the data packet with the at least one preprocessed data item to the second data bus subscriber.

12. A local bus with at least a first and a second data bus subscriber and a local bus master, the local bus master comprising:
    a transmitter to send a data packet with process data;
    wherein the first data bus subscriber comprises:
       a receiver to receive the data packet with process data;
       a process unit to preprocess at least one process data item of the received data packet; and
       a transmitter to send the data packet with the at least one preprocessed process data item to the second data bus subscriber;
    wherein the second data bus subscriber comprises:
       a receiver to receive the data packet with the at least one preprocessed process data item; and
       a process unit to further process the at least one preprocessed process data item,
    wherein the data packet comprises a plurality of symbols, each symbol having a plurality of bits, and
    wherein the transmitter to send the data packet with the process data sends the process data in the data packet symbol by symbol, or
    wherein the transmitter to send the data packet with the at least one preprocessed process data item sends the at least one preprocessed process data item in the data packet symbol by symbol.

13. The local bus according to claim 12, wherein the transmitter to send the data packet with the process data is adapted to send the process data in the data packet symbol by symbol, and
    wherein the transmitter to send the data packet with the at least one preprocessed process data item is adapted to send the at least one preprocessed process data item in the data packet symbol by symbol.

14. A method for the distributed processing of process data in a local bus, configured as a ring bus, with at least two data bus subscribers and a local bus master, the method comprising:
    determining a workload of the first data bus subscriber, the workload indicating whether the first data bus subscriber is adapted to perform a preprocessing of process data for a second data bus subscriber within working cycles available to the first data bus subscriber;

generating at least one instruction list, wherein the at least one instruction list comprises a set of instructions for preprocessing the process data by the first data bus subscriber, the instructions for the preprocessing depending on the determination of the workload;

sending the at least one instruction list to the first data bus subscriber; and sending a data packet with the process data through the local bus master via the local bus.

15. A local bus master of a local bus, configured as a ring bus, having at least two data bus subscribers, the local bus master comprising:

a determination unit to determine the workload of the first data bus subscriber, wherein the workload indicates whether the first data bus subscriber is adapted to perform a preprocessing of process data for a second data bus subscriber within work cycles available to said first data bus subscriber;

a generator to generator at least one instruction list, the at least one instruction list comprising a set of instructions for the preprocessing of the process data by the first data bus subscriber, the instructions for preprocessing being dependent on the determination of the workload;

a transmitter for sending the at least one instruction list to the first data bus subscriber; and a transmitter for sending a data packet with the process data via the local bus.

* * * * *